US010057358B2

(12) United States Patent
Johnson et al.

(10) Patent No.: US 10,057,358 B2
(45) Date of Patent: Aug. 21, 2018

(54) IDENTIFYING AND MAPPING EMOJIS

(71) Applicant: PAYPAL, INC., San Jose, CA (US)

(72) Inventors: Raoul Johnson, San Jose, CA (US); Christopher Harkness, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/374,964

(22) Filed: Dec. 9, 2016

(65) Prior Publication Data
US 2018/0167468 A1 Jun. 14, 2018

(51) Int. Cl.
H04L 29/08 (2006.01)
H04W 4/02 (2018.01)
G06F 17/24 (2006.01)
G06F 17/27 (2006.01)
G06F 3/0484 (2013.01)

(52) U.S. Cl.
CPC .............. *H04L 67/18* (2013.01); *G06F 17/24* (2013.01); *G06F 17/279* (2013.01); *H04W 4/02* (2013.01); *G06F 3/04842* (2013.01)

(58) Field of Classification Search
CPC ................................................. G06F 17/2863
See application file for complete search history.

(56) References Cited

U.S. PATENT DOCUMENTS

| 9,043,196 | B1 * | 5/2015 | Leydon | G07F 17/3244 |
| | | | | 704/4 |
| 9,712,550 | B1 * | 7/2017 | Thakurta | G06N 99/005 |
| 2013/0339983 | A1 * | 12/2013 | Dai | G06F 9/4443 |
| | | | | 719/318 |
| 2014/0052633 | A1 * | 2/2014 | Gandhi | G06Q 20/38 |
| | | | | 705/44 |
| 2016/0112362 | A1 * | 4/2016 | Perazzo | H04L 51/18 |
| | | | | 455/466 |
| 2016/0343062 | A1 * | 11/2016 | Morton | G06Q 30/0635 |
| 2017/0118189 | A1 * | 4/2017 | Venkatakrishnan | H04L 51/18 |
| 2017/0147185 | A1 * | 5/2017 | Milvaney | G06F 17/241 |
| 2017/0161238 | A1 * | 6/2017 | Fang | G06F 17/2235 |
| 2017/0249291 | A1 * | 8/2017 | Patel | G06F 17/24 |

* cited by examiner

*Primary Examiner* — Brian L Albertalli
(74) *Attorney, Agent, or Firm* — Haynes & Boone, LLP

(57) ABSTRACT

A computer system associates one or more actions with an emoji. The computer system detects a selection of the emoji within an electronic communication by a user. In response to the detecting the selection of the emoji within the electronic communication, the computer system initiates performance of at least one action of the one or more actions based on determining that one or more contextual factors associated with the electronic communication satisfy a set of conditions associated with the at least one action.

20 Claims, 6 Drawing Sheets

IDENTIFYING AND MAPPING EMOJIS

TECHNICAL FIELD

The present disclosure relates generally to emojis, and more particularly to identifying and mapping emojis.

BACKGROUND

An emoji is an ideogram or graphic symbol used in an electronic message or within a communication on a forum or web page. Common emojis include facial expressions, common objects, places, and icons representing a type of weather. In recent times, emojis have become increasingly popular worldwide, mostly due to their inclusion as an option within texting, social media, and email platforms. Furthermore, their availability within various mobile applications has made their use even more ubiquitous.

DETAILED DESCRIPTION

Embodiments of the present disclosure provide a system, method, and program product. A computer system associates one or more actions with an emoji. The computer system detects a selection of the emoji within an electronic communication by a user. In response to the detecting the selection of the emoji within the electronic communication, the computer system initiates performance of at least one action of the one or more actions based on determining that one or more contextual factors associated with the electronic communication satisfy a set of conditions associated with the at least one action.

Embodiments of the present disclosure will now be described in detail with reference to the accompanying Figures.

Figure 1:
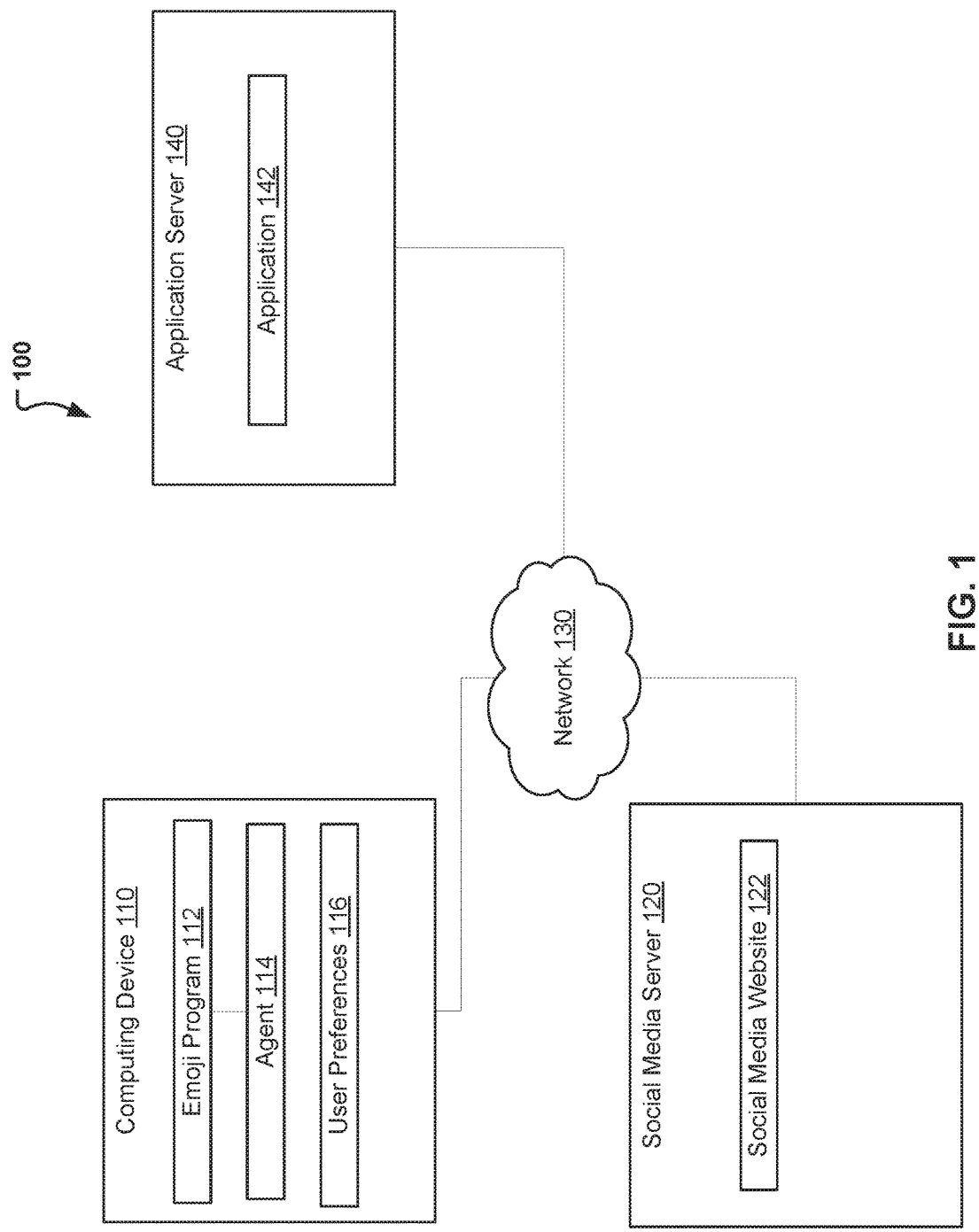
FIG. 1 illustrates an emoji system, in accordance with an embodiment.

FIG. 1 illustrates emoji system 100, in accordance with an embodiment. In an example embodiment, emoji system 100 includes computing device 110, social media server 120, and application server 140 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between computing device 110, social media server 120, and application server 140.

Application server 140 includes application 142. In the example embodiment, application server 140 is a computing device capable of receiving and sending data to and from other computing devices, such as computing device 110, via a network, such as network 130. For example, application server 140 may be a desktop computer, a laptop computer, a tablet computer, a handheld device, a smart-phone, a thin client, or any other electronic device or computing system capable of receiving and sending data to and from other computing devices. Although not shown, optionally, application server 140 can comprise a cluster of servers executing the same software to collectively process requests as distributed by a front end server and a load balancer. In the example embodiment, application server 140 is a computing device that is optimized for the support of applications that reside on application server 140, such as application 142, and for the support of network requests related to applications, which reside on application server 140. Application server 140 is described in more detail with reference to FIG. 6.

Application 142 is a software program that includes a collection of files, such as for example, hypertext markup language (HTML) files, Cascading Style Sheets (CSS) files, image files and JavaScript files. Application 142 may also include other resources such as audio files and video files. In one embodiment, application 142 is a software application capable of processing requests received from client mobile applications located on other computing devices.

Social media server 120 includes social media website 122. In the example embodiment, social media server 120 is a computing device capable of receiving and sending data to and from other computing devices, such as computing device 110, via a network, such as network 130. For example, social media server 120 may be a desktop computer, a laptop computer, a tablet computer, a handheld device, a smart-phone, a thin client, or any other electronic device or computing system capable of receiving and sending data to and from other computing devices. Although not shown, optionally, social media server 120 can comprise a cluster of servers executing the same software to collectively process requests as distributed by a front end server and a load balancer. In the example embodiment, social media server 120 is a computing device that is optimized for the support of websites that reside on social media server 120, such as social media site 122, and for the support of network requests related to websites, which reside on social media server 120. Social media server 120 is described in more detail with reference to FIG. 6.

Social media website 122 is a collection of files including, for example, HTML files, CSS files, image files and JavaScript files. Social media site 152 can also include other resources such as audio files and video files. In the example embodiment, social media website 122 is a website.

Computing device 110 includes emoji program 112, agent 114, and user preferences 116. Computing device 110 may be a desktop computer, a laptop computer, a tablet computer, a handheld device, a smart-phone, a thin client, or any other electronic device or computing system capable of receiving and sending data to and from other computing devices, such as social media server 120, via network 130. Computing device 110 is described in more detail with reference to FIG. 6.

User preferences 116 include information detailing one or more preferences of user of computing device 110. In the example embodiment, user preferences 116 includes one or more actions associated with each specified emoji. Therefore, when the selection of a specified emoji is detected by emoji program 112, emoji program 112 performs the corresponding action. In addition, user preferences 116 may contain conditions in which a specified emoji may correspond to an action. For example, user preferences 116 may specify that a first emoji corresponds to a first action if the user of computing device 110 is in a first location. Additionally, user preferences 116 may specify that the first emoji corresponds to a second action if the user of computing device 110 is in a second location. In the example embodiment, the user preferences are input by the user of computing device 110 via a user interface, however, in other embodiments, a portion or all of the preferences may be determined by emoji program 112 based on preferences associated with social contacts associated with the user of computing device 110, and stored in user preferences 116.

Agent 114 is a program that enables users to view, watch, or listen to documents and other resources, such as audio and video files, retrieved from a network device. In an exemplary embodiment, agent 114 requests documents and other resources from social media server 120 and/or application server 140 via network 130. In one example, Agent 114 may transmit a request to social media server 120 for documents and/or resources contained in social media website 122. Social media server 120 responds to the requests by retrieving the documents and resources from social media website 122, and transmitting them back to agent 114 via network 130. In the example embodiment, documents and resources retrieved by agent 114 are viewed by a user of computing device 110 on a display device. In one embodiment, agent 114 may be a web browser. In other embodiments, agent 114 may alternatively be an application, such as an application on a mobile device, or an alternative software program capable of transmitting and receiving documents and other resources from other computing devices, such as application server 140, and enabling users to view, watch, or listen to the received documents and/or resources.

In the example embodiment, emoji program 112 is a program capable of detecting an emoji utilized by the user of computing device 110, and further capable of identifying if the identified emoji is being utilized in a similar manner by other users. Furthermore, emoji program 112 is capable of associating an action with an emoji, and further, upon detection of a selection of the emoji, determining whether certain conditions are met prior to performing the associated action. Alternatively, emoji program 112 may associate an emoji with multiple actions, and upon detection of a selection of the emoji, determine which corresponding action to perform based on which conditions are satisfied. Furthermore, emoji program 112 may identify one or more emojis being utilized by social contacts associated with the user of computing device 110 and present the identified emojis to the user. Emoji program 112 is described in further detail below with reference to FIGS. 2 through 5.

Figure 2:
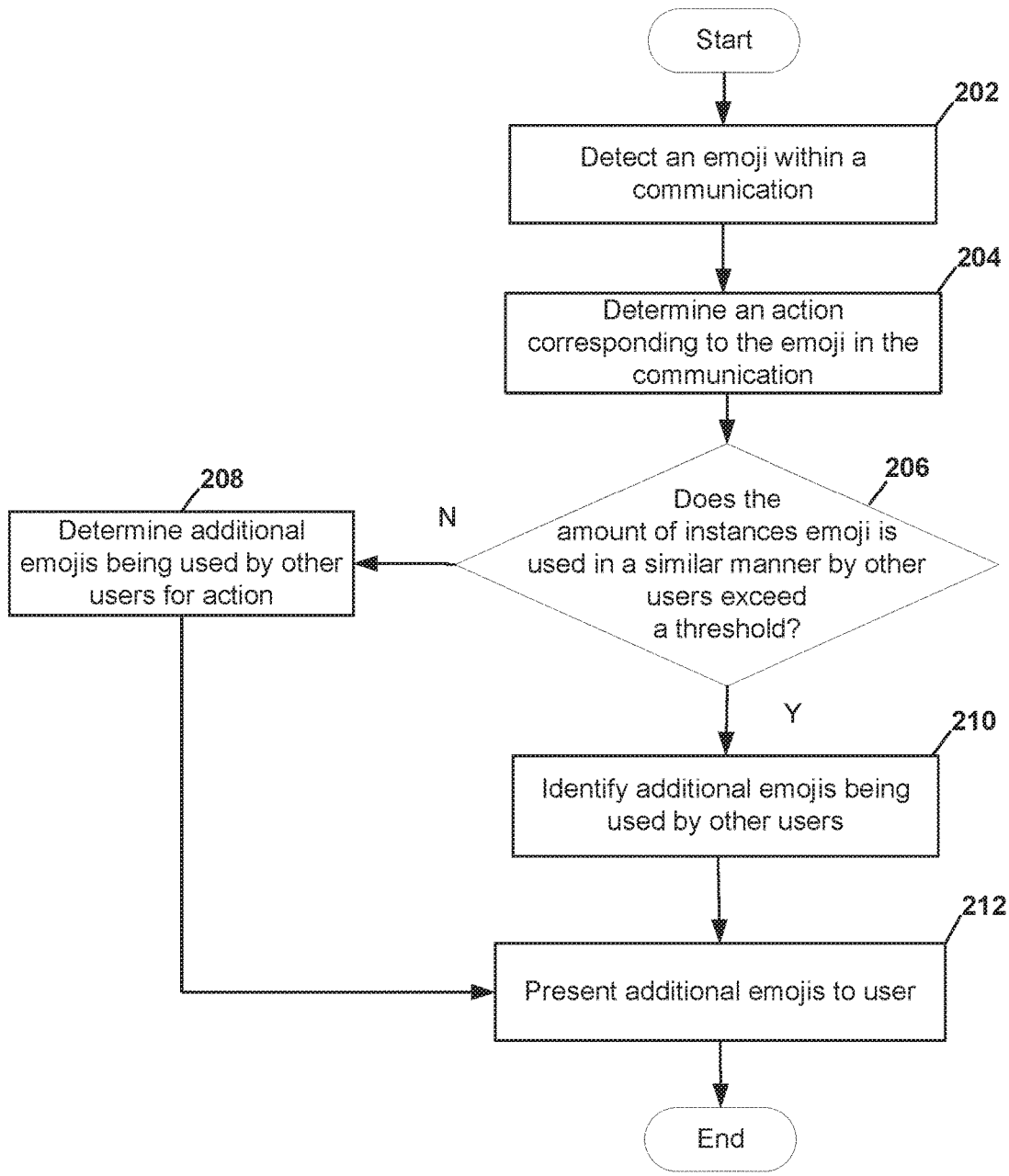
FIG. 2 is a flowchart illustrating the operations of the emoji program of FIG. 1 in determining whether an emoji is being utilized in a similar manner by other users, in accordance with an embodiment.

FIG. 2 is a flowchart illustrating the operations of emoji program 112 in determining whether an emoji is being utilized in a similar manner by other users, in accordance with an embodiment. In the example embodiment, emoji program 112 detects the utilization of an emoji in a communication by the user of computing device 110, within agent 114 (step 202). In the example embodiment, emoji program 112 detects an emoji being selected and used within agent 114 by being fully or partially integrated with agent 114. In another embodiment, where emoji program 112 is not integrated with agent 114, emoji program 112 detects the utilization of an emoji within agent 114 by communicating with the operating system of computing device 110. As stated above, in one embodiment, agent 114 is a software program, such as a mobile phone application or a web browser.

Emoji program 112 determines an action (or actions) corresponding to the emoji utilized in the communication by the user of computing device 110 (step 204). In the example embodiment, emoji program 112 determines an action that corresponds to the emoji utilized within the communication by referencing user preferences 116. As stated above, in the example embodiment, the user inputs or selects specific actions to associate with each emoji. Emoji program 112 stores the input or selected associations in user preferences 116. For example, emoji program 112 may reference user preferences 116 and determine that a first emoji being utilized in a communication by the user of computing device 110 corresponds with a first action.

Emoji program 112 determines whether the amount of instances that the specific emoji (emoji utilized by the user of computing device 110) is used in a similar manner (or same manner) by other users exceeds a threshold amount (decision 206). In the example embodiment, "other users" refers to social contacts of the user of computing device 110, however, in other embodiments, "other users" may refer to social contacts of the user of computing device 110 along with other users of social network platforms, forums, and the like. In further embodiments, "other users" may additionally or alternatively include users of social network platforms, forums, and the like that are the same age, have visited the same locations, and/or have participated in similar activities around the same time as the user of computing device 110.

In the example embodiment, emoji program 112 identifies a social network associated with the user of computing device 110 by communicating with social and professional networks/platforms/apps associated with the user, such as social media website 122 and/or application 142, via network 130. Emoji program 112 then identifies instances where the specific emoji (the emoji utilized by the user of computing device 110) has been utilized by social contacts associated with the user of computing device 110. Emoji program 112 analyzes the instances where the specific emoji has been utilized by the social contacts associated with the user and determines whether each instance of the specific emoji corresponds to an action that is the same or similar to the corresponding action detailed for the specific emoji in user preferences 116. Furthermore, emoji program 112 determines whether the amount of instances where the specific emoji has been utilized by the social contacts associated with the user in a same or similar manner exceeds a threshold amount. In the example embodiment, an amount is a percentage, however in other embodiments; an amount may be a number (or numerical amount). In the example embodiment, wherein an amount is a percentage, the threshold percentage is 75%, however in other embodiments; the threshold percentage may be a different value. Referring to the example above, where emoji program 112 referenced user preferences 116 and determined that a first emoji corresponds to a first action, emoji program 112 communicates with (or monitors) social media website 122 and/or application 142 in order to determine whether the amount of instances where the first emoji has been utilized by the social contacts in a same or similar manner exceeds a threshold amount. An example of similar actions may be actions that are associated with the same category but directed at different parties, or actions that produce similar results. For example, if action 1 is a payment to user A, and action 2 is a payment to user B, the actions may be considered similar. In another example, if action 1 performs the task of ordering a pizza via online chat, while action 2 performs the task of ordering a pizza via text, the actions may be considered similar. In a further example, if action 1 performs the task of ordering a pizza from a favorite pizza place of a first user and action 2 performs the task of ordering a pizza from a favorite pizza place of a second user, the actions may be considered similar. The aforementioned examples are a non-exhaustive list of what may be considered to be similar actions and are not intended to be limiting. In one embodiment, emoji program 112 may reference an electronic guide or database created by the user or a developer detailing which actions may be considered similar.

In other embodiments, where "other users" refers to social contacts of the user of computing device 110 along with other users of social network platforms, forums, and the like, program 112 analyzes the instances where the specific emoji has been utilized by the other users and determines whether the specific emoji is being utilized by the other users to perform an action that is the same or similar to the corresponding action detailed for the specific emoji in user preferences 116. In this other embodiment, emoji program 112 determines whether the amount of instances where the specific emoji has been utilized by the other users to perform an action that is the same or similar to the corresponding action detailed for the specific emoji in user preferences 116 exceeds the threshold amount.

In further embodiments, emoji program 112 may determine whether the amount of social contacts of the user of computing device 110 (or alternatively social contacts of the user of computing device along with other users of social network platforms, forums, and like) that have utilized the specific emoji to perform an action that is the same or similar to the corresponding action detailed for the specific emoji in user preferences 116 exceeds the threshold amount.

Overall, the phrases "the amount of similar utilization associated with the emoji" or "an amount that the emoji has been utilized by other users to perform a similar action" may refer to an amount of instances the emoji is utilized to perform a similar action by the other users, such as social contacts of the user, or an amount of the other users (such as social contacts) that have utilized the emoji to perform a similar action.

If emoji program 112 determines that the amount of instances that the specific emoji (emoji utilized by the user of computing device 110) is used in the same or similar manner by the other users does not exceed the threshold amount (decision 206, "NO" branch), emoji program 112 determines additional emojis that are being used by the other users to perform the determined action corresponding to the emoji utilized in the communication by the user of computing device 110 (step 208). In the example embodiment, where "other users" refers to the social contacts of the user of computing device 110, emoji program 112 communicates with (or monitors) social media website 122 and/or application 142 in order to determine additional emojis being utilized by the social contacts of the user of computing device 110 to perform the determined action corresponding to the emoji utilized in the communication by the user of computing device 110. In the example embodiment, emoji program 112 determines whether the amount each of the determined additional emojis have been utilized by the social contacts of the user of computing device 110 to perform the determined action exceeds a threshold amount. In other embodiments, emoji program 112 determines whether the amount of the social contacts of the user of computing device 110 that have utilized each of the determined additional emojis exceeds a threshold amount. As stated above, in the example embodiment, an amount is a percentage, however in other embodiments; an amount may be a number (or numerical amount). For example, if emoji program 112 determines that three additional emojis have been utilized to perform the determined action, with the first emoji being utilized three times, the second emoji being utilized twice, and the third emoji being utilized once, emoji program 112 compares the number of times each emoji has been utilized to a threshold number. In other embodiments, emoji program 112 compares the percentage corresponding to each emoji to a threshold percentage. Referring to the example, the percentage corresponding to the first emoji is 50% due to fact that it has been utilized three times out of a total of six times (second emoji utilized twice and third emoji utilized once).

Emoji program 112 presents the determined additional emojis to the user of computing device 110 (step 212). In the example embodiment, emoji program 112 presents the determined additional emojis that have been utilized an amount that exceeds the threshold amount. In other embodiments, emoji program 112 presents the determined additional emojis that have been utilized by an amount of other users that exceeds a threshold amount.

If emoji program 112 determines that the amount of instances that the specific emoji (emoji utilized by the user of computing device 110) is used in the same or similar manner by the other users does exceed the threshold amount (decision 206, "YES" branch), emoji program 112 determines additional emojis that are being used by the other users that utilized the specific emoji in the same or similar manner (step 210). In the example embodiment, where "other users" refers to the social contacts of the user of computing device 110, emoji program 112 communicates with (or monitors) social media website 122 and/or application 142 in order to determine additional emojis being utilized by the social contacts that utilized the specific emoji in the same or similar manner, and further identify the actions corresponding to each of the additional emojis (if there is a corresponding action). In the example embodiment, emoji program 112 determines whether the amount each of the determined additional emojis have been utilized by the social contacts that utilized the specific emoji in the same or similar manner exceeds a threshold amount. As stated above, in the example embodiment, an amount is a percentage, however in other embodiments; an amount may be a number (or numerical amount).

Emoji program 112 presents the determined additional emojis to the user of computing device 110 (step 212). In the example embodiment, emoji program 112 presents the determined additional emojis that have been utilized an amount that exceeds the threshold amount. In other embodiments, emoji program 112 presents all determined additional emojis that have been utilized by the social contacts that utilized the specific emoji in the same or similar manner.

As stated above, although in the example embodiment, emoji program 112 determines additional emojis based on analyzing emojis utilized by the social contacts of the user of computing device 110, in other embodiments, emoji program 112 may determine additional emojis to present to the user of computing device 110 based on analyzing emojis utilized by other users (social contacts of the user of computing device 110 along with other users of social network platforms, forums, and the like).

Figure 3:
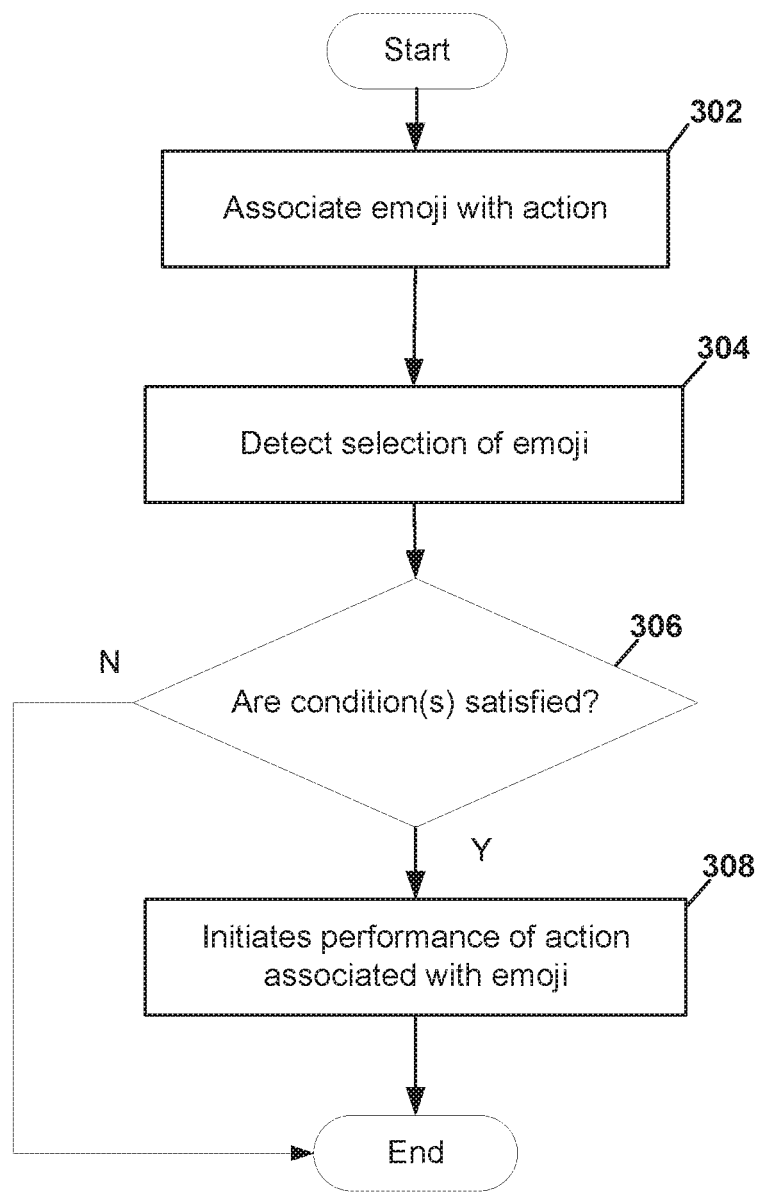
FIG. 3 is a flowchart illustrating the operations of the emoji program of FIG. 1 in determining whether to initiate performance of an action associated with an emoji, in accordance with an embodiment.

FIG. 3 is a flowchart illustrating the operations of emoji program 112 in determining whether to perform an action (or actions) associated with an emoji, in accordance with an embodiment. In the example embodiment, emoji program 112 associates an action(s) with a specific emoji (step 302). In the example embodiment, emoji program 112 receives input from the user of computing device 110 describing the action to associate with the specific emoji. Emoji program 112 may then store the input in user preferences 116. Furthermore, the user of computing device 110 may provide input describing a condition (or conditions) that must be met in order to initiate performance of the action(s) associated with the specific emoji. Emoji program 112 associates the condition (or conditions) with the specific emoji. For example, the user of computing device 110 may input that utilization of the first emoji results in the performance of a first action only if the first emoji is utilized during the time period of noon until 1 pm. Emoji program 112 receives the input and stores the condition in association with the first emoji.

Emoji program 112 detects the selection of the specific emoji within agent 114 by the user of computing device 110 (step 304). In the example embodiment, emoji program 112 detects that the specific emoji has been selected for utilization within agent 114 by being fully or partially integrated with agent 114. In another embodiment, where emoji program 112 is not integrated with agent 114, emoji program 112 detects the utilization of an emoji within agent 114 by communicating with the operating system of computing device 110. As stated above, in one embodiment, agent 114 is a software program, such as a mobile phone application or a web browser.

Emoji program 112 determines whether the condition(s) associated with the specific emoji has been satisfied based on comparing one or more contextual factors associated with the communication the specific emoji was utilized in to the condition(s) (decision 306). Contextual factors associated with the communication may include factors such as a location associated with the communication, a date/time associated with the communication, a topic of the communication, a recipient(s) of the communication, contacts of the user present in the same location as the user (or within a threshold distance) when the communication is transmitted, and additional factors related to the communication. In the example embodiment, emoji program 112 references user preferences 116 and determines the conditions associated with the specific emoji. Referring to the example above, if the condition associated with the specific emoji is for utilization to be detected during the time period of noon and 1 pm, emoji program 112 determines whether utilization of the specific emoji was detected during the stated time period. In other words, emoji program 112 references metadata associated with the communication the specific emoji was utilized in, in order to determine the associated time period.

In another example, if the condition associated with specific emoji is that the user of computing device 110 be at work, emoji program 112 may reference an electronic calendar or schedule associated with the user of computing device 110 in order to determine whether the user of computing device 110 is at work. Alternatively, emoji program 112 may reference location information in metadata associated with the communication or may utilize/communicate with a GPS module to determine the location of the user of computing device 110, and utilize the location information to determine whether the user is at work (by for example, cross-referencing the location with work location information present on social media website 122). Similarly, emoji program 112 may reference information in the communication, such as tagged locations of social contacts, reference information in additional communications corresponding to one or more of the social contacts that have taken place within a recent time period, and/or communicate with a GPS module present in one or more devices associated with the social contacts of the user in order to determine that the social contacts are present in the same location as the user when the communication was transmitted (or within a threshold distance, such as in the same room or building). Furthermore, a beacon present at the location may communicate with the device of the user and the devices of the social contacts in order to determine that they are present in the same location or within a threshold distance of each other.

In a further example, emoji program 112 may determine a topic associated with the communication by utilizing natural language processing, and compare the determined topic to the conditions in user preferences 116. For example, a condition may recite that a lunch order be placed if the topic of the communication associated with the specific emoji is determined to be lunch.

If emoji program 112 determines that the condition (or conditions) are not satisfied (decision 306, "NO" branch), then emoji program 112 does not initiate performance of the action associated with the specific emoji. If emoji program 112 determines that the condition (or conditions) are satisfied (decision 306, "YES" branch), emoji program 112 initiates performance of the action associated with the specific emoji (step 308).

Figure 4:
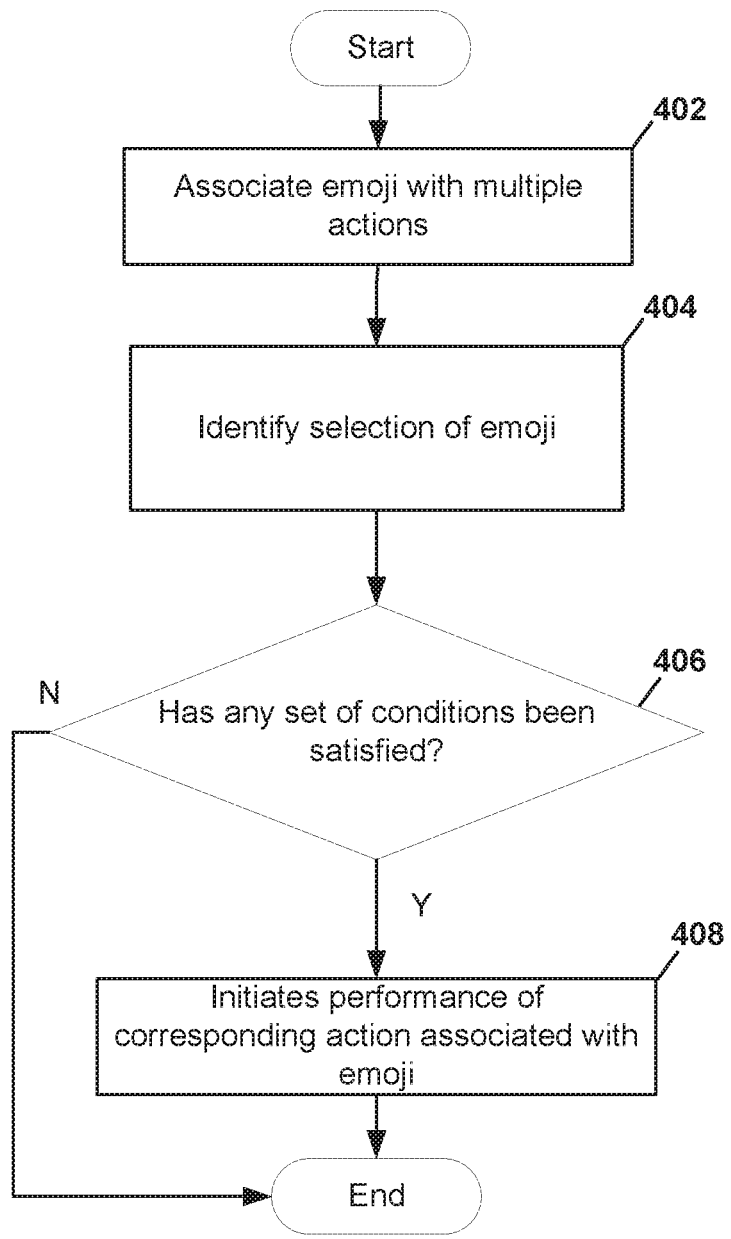
FIG. 4 is a flowchart illustrating the operations of the emoji program of FIG. 1 in determining whether any set of conditions associated with an emoji have been satisfied, in accordance with an embodiment.

FIG. 4 is a flowchart illustrating the operations of emoji program 112 in determining which action (or actions) associated with an emoji to perform, in accordance with an embodiment. In the example embodiment, emoji program 112 associates multiple actions with a specific emoji (step 402). In the example embodiment, emoji program 112 receives input from the user of computing device 110 describing the actions to associate with the specific emoji. Emoji program 112 may then store the input in user preferences 116. Furthermore, the user of computing device 110 associates each of the actions with a condition (or conditions) that must be met in order to initiate performance of the respective action. For example, the user of computing device 110 may provide input detailing that utilization of the first emoji results in the performance of a first action only if the emoji is utilized during the time period of noon until 1 pm, and results in the performance of a second action if the emoji is utilized in any other time period. Emoji program 112 may then store the input in association with the first emoji.

Emoji program 112 detects the selection of the specific emoji within agent 114 by the user of computing device 110 (step 404). In the example embodiment, emoji program 112 detects that the specific emoji has been selected for utilization within agent 114 by being fully or partially integrated with agent 114. In another embodiment, where emoji program 112 is not integrated with agent 114, emoji program 112 detects the utilization of an emoji within agent 114 by communicating with the operating system of computing device 110. As stated above, in one embodiment, agent 114 is a software program, such as a mobile phone application or a web browser.

Emoji program 112 determines whether any set of conditions associated with any of the actions corresponding to the specific emoji are satisfied based on comparing one or more contextual factors associated with the communication the specific emoji was utilized in to each set of conditions (decision 406). As stated above, contextual factors associated with the communication may include factors such as a location associated with the communication, a date/time associated with the communication, a topic of the communication, a recipient(s) of the communication, contacts of the user present in the same location as the user when the communication is transmitted, and additional factors related to the communication. In the example embodiment, emoji program 112 references user preferences 116 and determines/analyzes the condition(s) associated with each corresponding action of the specific emoji. For example, if the condition associated with a first action is for utilization of the specific emoji to be detected during the time period of noon to 1 pm, and the condition associated with a second action is for utilization of the specific emoji to be detected during time period of 2 pm to 5 pm, emoji program 112 determines the time period when the specific emoji is utilized, and based on the determined time period, determines if either set of conditions are satisfied. In other words, emoji program 112 references metadata associated with the communication the specific emoji was utilized in, in order to determine the associated time period.

If emoji program 112 determines that no set of conditions are satisfied (decision 406, "NO" branch), emoji program 112 does not initiate any action. If emoji program 112 determines that a set of conditions are satisfied (decision 306, "YES" branch), then emoji program 112 initiates performance of the action corresponding to the set of conditions that have been determined to be satisfied.

As stated above, although in the example embodiment, an emoji is associated with an action, in other embodiments, an emoji may be associated with multiple actions. For example, based on a certain set of conditions being satisfied, emoji program 112 may initiate performance of multiple actions.

Figure 5:
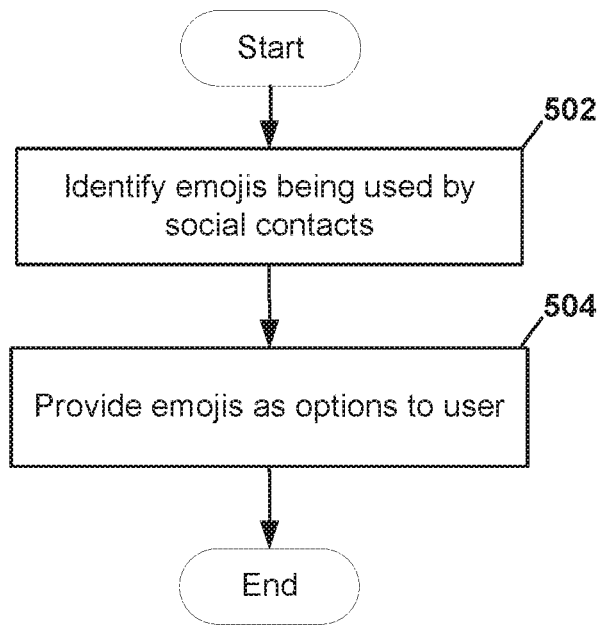
FIG. 5 is a flowchart illustrating the operations of the emoji program of FIG. 1 in providing emojis as options to a user, in accordance with an embodiment of the invention.

FIG. 5 is a flowchart illustrating the operations of emoji program 112 in determining emojis being utilized by social contacts of the user of computing device 110, in accordance with an embodiment. In the example embodiment, emoji program 112 detects or identifies emojis being utilized by social contacts of the user of computing device 110 (step 502). In the example embodiment, emoji program 112 communicates with (or monitors) social media website 122 and/or application 142 in order to determine emojis being utilized by the social contacts of the user of computing device 110, and further identifies the actions corresponding to each of the emojis (if there is a corresponding action). In the example embodiment, emoji program 112 determines whether the amount each of the determined emojis have been utilized by the social contacts exceeds a threshold amount. As stated above, in the example embodiment, an amount is a percentage, however in other embodiments; an amount may be a number (or numerical amount). In other embodiments, emoji program 112 determines whether the amount of the social contacts of the user of computing device 110 that have utilized each of the determined emojis exceeds a threshold amount.

Emoji program 112 presents the determined emojis to the user of computing device 110 (step 504). In the example embodiment, emoji program 112 presents the determined emojis that have been utilized an amount that exceeds the threshold amount. In other embodiments, emoji program 112 presents all determined emojis that have been utilized by the social contacts.

As stated above, although in the example embodiment, emoji program 112 determines emojis to present based on analyzing emojis utilized by the social contacts of the user of computing device 110, in other embodiments, emoji program 112 may determine emojis to present to the user of computing device 110 based on analyzing emojis utilized by social contacts of the user of computing device 110 along with other users of social network platforms, forums, and the like.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 6:
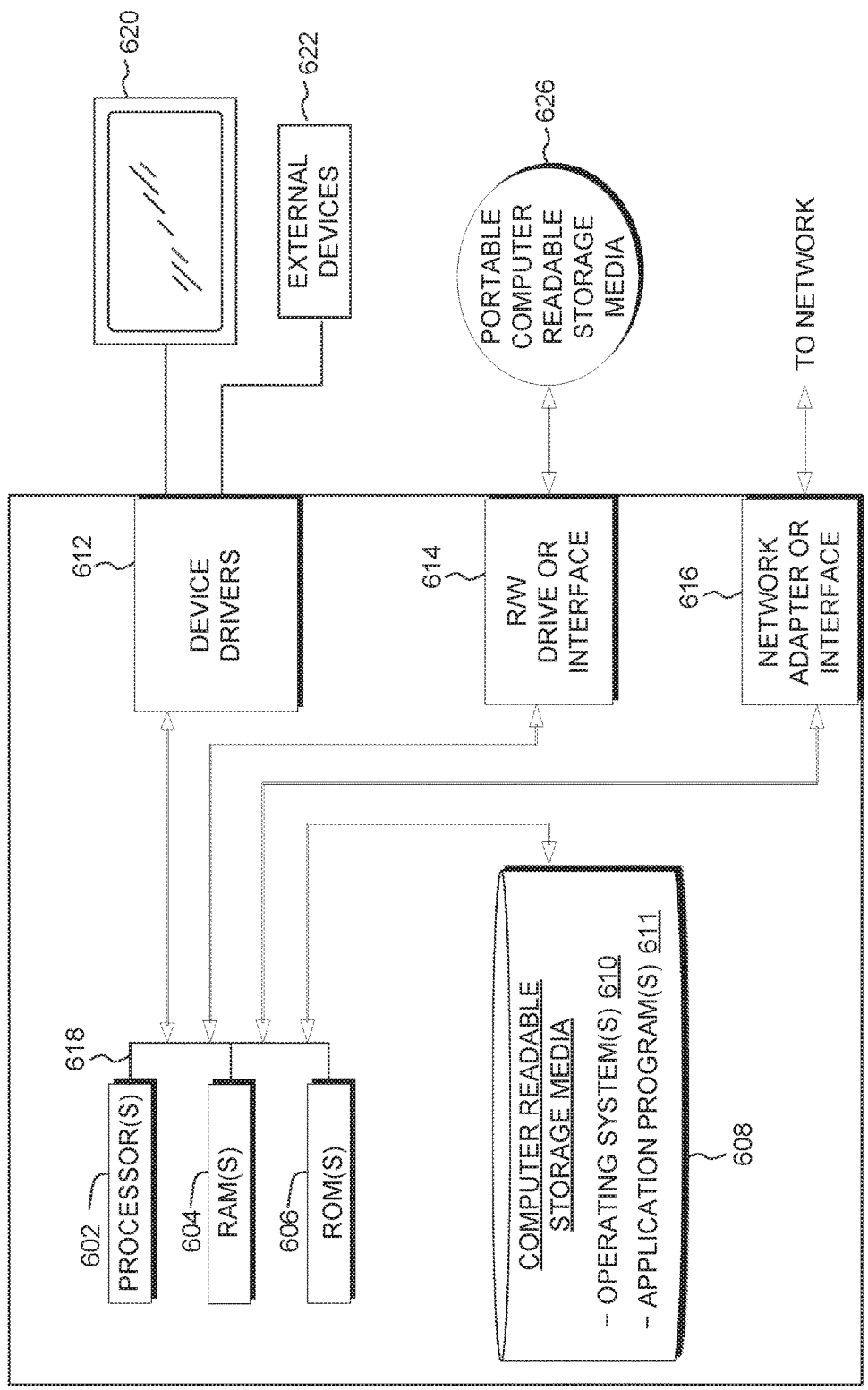
FIG. 6 is a block diagram depicting the hardware components of the emoji system of FIG. 1 and FIG. 5, in accordance with an embodiment.

FIG. 6 depicts a block diagram of components of computing devices contained in emoji system 100 of FIG. 1, in accordance with an embodiment. It should be appreciated that FIG. 6 provides only an illustration of one implementation and does not imply any limitations with regard to the environments in which different embodiments may be implemented. Many modifications to the depicted environment may be made.

Computing devices may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, emoji program 112, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 614 to read from and write to one or more portable computer readable storage media 626. Application programs 611 on the computing devices may be stored on one or more of the portable computer readable storage media 626, read via the respective R/W drive or interface 614 and loaded into the respective computer readable storage media 608.

Computing devices may also include a network adapter or interface 616, such as a TCP/IP adapter card or wireless communication adapter (such as a 4G wireless communication adapter using OFDMA technology). Application programs 611 on the computing devices may be downloaded to the computing devices from an external computer or external storage device via a network (for example, the Internet, a local area network or other wide area network or wireless network) and network adapter or interface 616. From the network adapter or interface 716, the programs may be loaded onto computer readable storage media 608. The network may comprise copper wires, optical fibers, wireless transmission, routers, firewalls, switches, gateway computers and/or edge servers.

Computing devices may also include a display screen 620, and external devices 722, which may include, for example a keyboard, a computer mouse and/or touchpad. Device drivers 612 interface to display screen 620 for imaging, to external devices 622, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
    a non-transitory memory; and
    one or more hardware processors coupled with the non-transitory memory and configured to read instructions from the non-transitory memory to cause the system to perform operations comprising:
        associating a plurality of actions with an emoji, wherein each action in the plurality of actions is associated with a set of conditions;
        detecting a selection of the emoji within an electronic communication by a user on a user device, wherein the user is associated with a user account;
        in response to detecting the selection of the emoji within the electronic communication, analyzing data related to one or more contextual factors associated with the electronic communication obtained from the user device;
        determining, based on the analyzing, that one set of conditions associated with an action from the plurality of actions is satisfied; and
        in response to the determining that the one set of conditions is satisfied, performing an electronic transaction using the user account of the user based on the action.

2. The system of claim 1, wherein the action comprises a series of sub-actions.

3. The system of claim 1, wherein analyzing the data related to the one or more contextual factors associated with the electronic communication comprises:
    determining that a time period within which the electronic communication was transmitted satisfies a time condition of the one set of conditions by referencing metadata associated with the electronic communication.

4. The system of claim 1, wherein analyzing the data related to the one or more contextual factors associated with the electronic communication comprises:
    determining a first location corresponding to the user device based on location information obtained from a location component of the user device; and
    determining that the first location satisfies a location condition of the one set of conditions.

5. The system of claim 4, wherein analyzing the data related to the one or more contextual factors associated with the electronic communication further comprises:
    identifying a recipient of the electronic communication based on metadata associated with the electronic communication;
    determining a second location corresponding to a recipient device of the recipient based on location information obtained from a location component of the recipient device; and
    determining that a distance between the first location of and the second location satisfies a threshold distance condition of the one set of conditions.

6. The system of claim 1, wherein analyzing the data related to the one or more contextual factors associated with the electronic communication comprises:
    deriving a topic associated with the electronic communication by performing a natural language analysis on the electronic communication; and
    determining that the derived topic satisfies a topic condition of the one set of conditions.

7. The system of claim 1, wherein the one set of conditions includes a plurality of conditions.

8. The system of claim 1, wherein the operations further comprise extracting metadata from the electronic communication, wherein the data related to the one or more contextual factors associated with the electronic communication comprises the extracted metadata.

9. The system of claim 1, wherein the electronic communication is addressed to a first recipient, wherein the operations further comprise retrieving at least one other electronic communication generated by the user and addressed to a second recipient different form the first recipient, wherein the data related to the one or more contextual factors associated with the electronic communication comprises the at least one other electronic communication.

10. A method comprising:
    associating, by one or more hardware processors, a plurality of actions with an emoji, wherein each action in the plurality of actions is associated with a set of conditions;
    detecting, by the one or more hardware processors, a selection of the emoji within an electronic communication by a user on a user device, wherein the user is associated with a user account;
    in response to detecting the selection of the emoji within the electronic communication, analyzing, by the one or more hardware processors, the electronic communication and data related to one or more contextual factors associated with the electronic communication obtained from the user device;
    determining, based on the analyzing, that one set of conditions associated with an action from the plurality of actions is satisfied; and
    in response to the determining that the one set of conditions is satisfied, performing, by the one or more hardware processors, an electronic transactions using the user account of the user based on the actions.

11. The method of claim 10, wherein analyzing the data related to the one or more contextual factors associated with the electronic communication comprises:
    determining that a time period within which the electronic communication was transmitted satisfies a time condition of the one set of conditions by referencing metadata associated with the electronic communication.

12. The method of claim 10, wherein analyzing the data related to the one or more contextual factors associated with the electronic communication comprises:

determining a first location corresponding to the user device based on location information obtained from a location component of the user device; and determining that the first location satisfies a location condition of the one set of conditions.

13. The method of claim 12, wherein analyzing the data related to the one or more contextual factors associated with the electronic communication further comprises:

identifying a recipient of the electronic communication based on metadata associated with the electronic communication;

determining a second location corresponding to a recipient device of the recipient based on location information obtained from a location component of the recipient device; and determining that a distance between the first location and the second location satisfies a threshold distance condition of the one set of conditions.

14. The method of claim 10, wherein analyzing the data related to the one or more contextual factors associated with the electronic communication comprises:

deriving a topic associated with the electronic communication by performing a natural language analysis on the electronic communication; and determining that the derived topic satisfies a topic condition of the one set of conditions.

15. The method of claim 10, wherein the one set of conditions includes a plurality of conditions.

16. A non-transitory machine readable medium having stored thereon machine-readable instructions executable to cause a machine to perform operations comprising:

associating a plurality of actions with an emoji, wherein each action in the plurality of actions is associated with a set of conditions;

detecting a selection of the emoji within an electronic communication by a user on a user device, wherein the user is associated with a user account;

in response to detecting the selection of the emoji within the electronic communication, analyzing data related to one or more contextual factors associated with the electronic communication obtained from the user device;

determining, based on the analyzing, that one set of conditions associated with an action from the plurality of actions is satisfied; and in response to the determining that the one set of conditions is satisfied, performing an electronic transaction using the user account of the user based on the action.

17. The non-transitory machine readable medium of claim 16, wherein analyzing the data related to the one or more contextual factors associated with the electronic communication comprises determining that a time period within which the electronic communication was transmitted satisfies a time condition of the one set of conditions based on metadata associated with the electronic communication.

18. The non-transitory machine readable medium of claim 16, wherein analyzing the data related to the one or more contextual factors associated with the electronic communication comprises:

determining a first location corresponding to the user device based on location information obtained from a location component of the user device; and determining that the first location satisfies a location condition of the one set of conditions.

19. The non-transitory machine readable medium of claim 18, wherein analyzing the data related to the one or more contextual factors associated with the electronic communication further comprises:

identifying a recipient of the electronic communication based on metadata associated with the electronic communication;

determining a second location corresponding to a recipient device of the recipient based on location information obtained from a location component of the recipient device; and determining that a distance between the first location and the second location satisfies a threshold distance condition of the first set of conditions.

20. The non-transitory machine readable medium of claim 16, wherein analyzing the data related to the one or more contextual factors associated with the electronic communication comprises:

deriving a topic associated with the electronic communication by performing a natural language analysis on the electronic communication; and determining that the derived topic satisfies a topic condition of the one set of conditions.

* * * * *